United States Patent Office 2,840,575
Patented June 24, 1958

2,840,575
METHOD OF PRODUCING AN ISOMERISATION PRODUCT OF VITAMIN D OR AN ESTER THEREOF

Arie Lambertus Koevoet and Arie Verloop, Leiden, and Jan Anne Keverling Buisman, Weesp, Netherlands, assignors, by mesne assignments, to North American Philips Company, Inc., New York, N. Y., a corporation of Delaware No Drawing. Application April 4, 1956
Serial No. 576,221

Claims priority, application Netherlands
September 26, 1955

8 Claims. (Cl. 260—397.2)

It is known that precalciferol can be isomerized with the aid of iodine in diffuse daylight into tachysterol (Recueil des Travaux chimiques des Pays-Bas 74, pages 788 to 792, 1955).

It is furthermore known that with isomerisation of calciferol with iodine in a concentrated etheric solution isotachysterol is produced and, moreover, that, if this reaction is carried out in a non-polar medium (petroleum ether) the maximum of the ultraviolet-absorption spectrum shifts to about 270 m$\mu$ (Recueil des Travaux chimiques des Pays-Bas 74, pages 788 to 792, 1955).

Reference may finally be made to "Ang. Chemie" 67, page 276, 1955 and "Chem. Berichte" 88, pages 1415 to 1423, more particularly, page 1416, from which are known the synthesis of trans-vitamin $D_2$ tetrachydropyranil ether and trans-vitamin $D_2$ alcohol from para-acetoxycyclohexanone and the so-called $C_{21}$ decomposition aldehyde of vitamin $D_2$.

It has now been found that during the isomerisation of vitamin D or of an ester thereof with a catalyst, which is capable of converting cis-isomers into trans-isomers, in a neutral or slightly alkaline solution trans-vitamin D or an ester thereof is produced substantially without the formation of byproducts. This trans-vitamin D may be isolated from the reaction mixture by converting the isomerisation product into a crystallisable ester, which may, if desired, be saponified subsequently. It has furthermore been found that this trans-vitamin D or an ester thereof can be reduced with a reducing agent, which is suitable to saturate partially systems conjugated double bonds to obtain a dihydrotachysterol.

In accordance herewith the invention relates to a method of producing an isomerisation product of vitamine D or an ester thereof and is characterized in that to a neutral or slightly alkaline solution of vitamin D or an ester thereof, for example the acetic acid ester or benzoic acid ester, is added a catalyst, which is capable of converting cis-isomers into trans-isomers, whereafter the isomerized product is converted into a crystallizable ester, which is, if desired subsequent to saponification, separated out of the reaction mixture and in that, if desired, the product thus obtained subsequent to esterifying, is reduced to dihydrotachysterol or an ester thereof by means of a reducing agent, which is capable of partially saturating a system of conjugated double bonds, the dihydrotachysterol thus obtained being isolated from the reaction mixture by methods known per se for isolating dihydrotachysterol.

In this application the term vitamin D is to be understood to mean not only vitamin $D_2$ but also vitamin $D_3$. The term trans-vitamin D is to be understood to mean a product which is obtained in the manner according to the invention by isomerisation from vitamin $D_2$ or $D_3$ or esters thereof, this trans-vitamin D dissolved in ethanol, having a maximum in the ultraviolet absorption spectrum at 272 m$\mu\pm$1 m$\mu$.

A dihydrotachysterol is to be understood to mean a product which exhibits the formula:

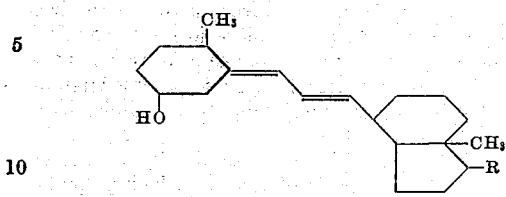

and which may be formed by reduction of a tachysterol with an alkaline metal and an aliphatic alcohol.

A tachysterol is a compound which is produced by ultra-violet irradiation of a solution of 3-hydroxy-$\Delta$-5,7 sterol, this tachysterol having a maximum in the absorption spectrum at 281 m$\mu$ and being furthermore characterized by the following structural formula:

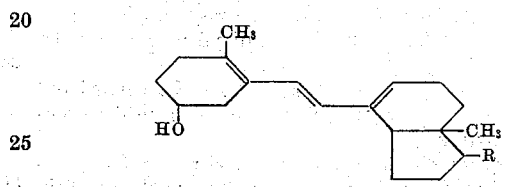

In both formulae R designates an aliphatic hydrocarbon residue, which may contain one or more double bonds. Neither the sterochemical configurations of dihydrotachysterol, nor that of tachysterol itself are known.

Catalysts capable of producing the said cis-transisomerisation are, for example, iodine or eosine under the action of light, which is absorbed during the reaction. The isomerisation is preferably carried out with iodine, inter alia, since in this method a comparatively large yield of trans-vitamin D is obtained.

It is highly important that the solvent should not exhibit an acidic reaction during the isomerisation. Even the production of traces of acid may have a harmful effect on the yield of trans-vitamin D. For this reason it is advisable to add to the solvent used a compound which is capable of binding any acids that are formed. For this purpose use may, for example, be made of tertiary amines, which do not render the catalyst inactive, for example pyridine, collidine, quinoline.

Since also the solvents employed could form an acid under the action of the catalyst, it is advisable to choose the solvent carefully. Very suitable are found to be aliphatic or cyclic hydrocarbons or mixtures thereof, for example, petroleum ether, ligroine, gasoline, benzene, toluene or cyclohexane.

As an alternative, use may be made of ethers, for example, diethyl ether and, moreover, carbon disulphide.

If the conversion of vitamin D into trans-vitamin D takes place in liquids, referred to in the preceding paragraph, it is advisable to use a low concentration of vitamin D, i. e. lower than 1 mg. of vitamin D per 100 cm.$^3$ of solvent, since otherwise so-called isotachysterol is produced. This restriction is, however, not imperative, if to these solvents is added a compound which is capable of binding acids, for example, the aforesaid tertiary amines.

The trans-vitamin D obtained is preferably separated out as the para-phenylazobenzoic acid ester from the reaction mixture (the

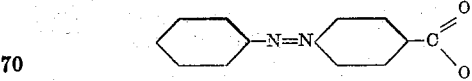

group is bound to carbon atom 3 of the sterol skeleton).

This ester may be produced by causing trans-vitamin D, dissolved in an indifferent solvent, for example benzene, toluene, cyclohexane or diethyl ether, to react with a para-phenylazobenzoyl halide, for example the chloride or bromide in the presence of an acid binder, for example, a tertiary amine such as pyridine, collidine.

The trans-vitamin D may, however, as an alternative, be crystallized by introducing cyanic acid into a solution of this compound. Thus the allophane acid ester is produced. This ester may be converted into trans-vitamin D by simple alkaline saponification, for example, with alcoholic lye.

The reduction of trans-vitamin D to dihydrotachysterol may be carried out by means of various reducing agents. In general, use may be made of reducing agents by which a system of double bonds can be partially saturated, for example, hydrogen and Raney nickel or an alkaline metal and an aliphatic alcohol with 1 to 6 carbon atoms, for example, sodium and ethanol, butanol, 2-methyl-butanol-2, glycol and glycerol.

The invention permits not only the production of trans-vitamin D directly from vitamin D (the first-mentioned substance is found to have attractive physiological properties), but also the production of dihydrotachysterol by a new method.

The reduction may, as an alternative, be carried out prior to the separation of trans-vitamin D from the isomerisation mixture.

The dihydrotachysterol may be separated out by suitable processes, for example, by a method as described in Dutch patent specification No. 50,402. According to this method a dihydrotachysterol mixture containing dihydrotachysterol is chromatographed and the fractions having a high content of dihydrotachysterol are esterified, for example, with acetic acid anhydride in the presence of pyridine, and dihydrotachysterol acetate is crystallized. By alkaline hydrolization of this crystallized ester, for example, with the aid of alcoholic lye, pure dihydrotachysterol is obtained.

Example I 1 g. of ergocalciferol (vitamin $D_2$) was dissolved in 50 mls. of petroleum ether (boiling temperature range 40° C. to 60° C.) purified by fuming sulphuric acid. To the solution was added a solution of 20 mgs. of $J_2$ in 16 mls. of petroleum ether (boiling temperature range 40° C. to 60° C.) after which the mixture was exposed in a glass bulb, in which the air had been replaced by nitrogen, to diffuse daylight for 60 minutes. At the end of this period the mixture was shaken in a separation funnel under nitrogen with a diluted, aqueous thiosulphate solution in order to remove the iodine. The petroleum-etheric solution was distilled off in vacuo, subsequent to drying over $Na_2SO_4$, the residue was dissolved in a few milliliters of benzene, which benzene was distilled off in vacuo in order to remove traces of moisture. The residue thus dried was dissolved in 20 mls. of anhydrous, thiophene-free benzene, after which 5 mls. of anhydrous pyridine was added to this solution and then a solution of 1 g. of phenylazobenzoyl-chloride in 5 mls. of benzene: all processes being carried out with the exclusion of oxygen and moisture. After having kept the mixture at room temperature for one night "trans" vitamin $D_2$-phenylazobenzoic acid ester was separated out by adding to the reaction mixture water and diethyl ether and by washing the etheric extract in succession with an aqueous bicarbonate solution, an aqueous sodium chloride solution, diluted sulphuric acid, an aqueous sodium chloride solution and an aqueous bicarbonate solution and by drying the extract subsequently over sodium sulphate and subjecting it to distillation. The ester was recrystallized from acetone. The yield was 550 mgs. The melting point of the ester was 104° C. to 106° C.

Part of this substance was subjected to an alkaline hydrolisation: to this end 50 mgs. of ester was dissolved in 10 mls. of diethyl ether. Thereto was added 20 mls. of a 12% solution of potassium hydroxide in absolute methanol. This mixture was boiled at a reflux cooler for half an hour: then it was extracted with diethyl ether under nitrogen and the etheric solution was washed with water. Of the etheric solution an ultraviolet absorption spectrum was measured. It exhibited a maximum at 272 m$\mu$, $$E^{1\%}_{1cm.} = 550$$

Example II 47.8 mgs. of vitamin $D_2$ was dissolved in 2 mls. of absolute diethyl ether. To this solution was added 1 ml. of a solution containing 4.6 mgs. of $J_2$ + 6.8 mgs. of pyridine in 5 mls. of diethyl ether. After 40 minutes of exposure to diffuse daylight, it was found by spectrophotometric examination that the ultraviolet absorption spectrum of the solution had a maximum at $$272\ m\mu + E^{1\%}_{1cm.} = 540$$

(calculated on the quantity of vitamin $D_2$).

Example III 50 mgs. of cholecalciferol (crystallized vitamin $D_3$) was dissolved in 80 mls. of diethyl ether: to this solution was added a solution of 1 mg. of iodine and 1 mg. of pyridine in 0.5 ml. of diethyl ether. After the solution had been exposed in a glass bulb under nitrogen at room temperature to diffuse daylight for half an hour, the absorption maximum at 272 m$\mu$ proved that the vitamin $D_3$ had been converted into trans-vitamin $D_3$.

Example IV 6 gs. of sodium was atomized in a three-neck bulb arranged in an oil bath and having an inlet tube for nitrogen, a reflux cooler, an agitator and a dripping funnel, under 60 mls. of dry, boiling xylene, into a nitrogen atmosphere. Then 2.5 gs. of the raw isomerisation product of calciferol with iodine $$(E^{1\%}_{1cm.}\ (271\ m\mu) = 543)$$

(produced in diethyl ether with pyridine as described in Example II), dissolved in 30 mls. of dry xylene, was added as a whole, after which in the course of 15 minutes a mixture of 36 mls. of 2-methylbutanol-2 and 24 mls. of dry xylene was added in drops, whilst the mixture was stirred vigorously, at a bath temperature of 150° C. Then, in succession, in the course of 15 minutes 36 mls. of 2-methylbutanol-2 was added twice in drops, the further conditions being the same. Stirring was continued at this temperature for 1¼ hours. The excess quantity of sodium was removed mechanically after cooling and the mixture was then subjected to steam distillation. After all xylene had gone over, the residue in the bulb was extracted with diethyl ether, the etheric solution was washed three times with water, dried and subjected to distillation. The amorphous residue exhibited the ultraviolet absorption spectrum of dihydrotachysterol$_2$ (maxima at 242, 251 and 261 m$\mu$, $$E^{1\%}_{1cm.}\ (251) = 310)$$

A paper-chromatographical examination proved the presence of dihydrotachysterol$_2$ at the side of dihydro-vitamin $D_2$-II.

Example V 2.5 gs. of trans-vitamin $D_2$ $$(E^{1\%}_{1cm.}\ (271\ m\mu) = 543)$$

was dissolved in 125 mls. of ethanol, after the addition of 1 g. of Raney nickel catalyst the mixture was shaken in a hydrogen atmosphere. After 30 minutes about 170 mls. of hydrogen had been absorbed by the mixture. After filtration the solvent was distilled off.

A paper-chromatographical examination proved the presence of dihydrotachysterol$_2$.

Similar results were obtained with the reduction of trans-vitamin $D_3$.

What is claimed is:

1. A method of producing trans-isomers of a compound selected from the group consisting of vitamin D and esters thereof comprising the steps, forming a neutral to alkaline solution of said compound, introducing a catalyst capable of converting cis-isomers into trans-isomers into said solution, said catalyst being selected from the group consisting of iodine and eosine, and exposing said solution to visible light.

2. A method of producing trans-isomers of a compound selected from the group consisting of vitamin D and esters thereof comprising the steps, forming a neutral to alkaline solution of said compound in at least one hydrocarbon selected from the group consisting of petroleum ether, ligroine, benzene, toluene, gasoline, and cyclohexane, introducing a catalyst capable of converting cis-isomers into trans-isomers into said solution, said catalyst being selected from the group consisting of iodine and eosine, and exposing said solution to visible light.

3. A method of producing trans-isomers of a compound selected from the group consisting of vitamin D and esters thereof comprising the steps, forming a neutral to alkaline solution of said compound in an aliphatic ether, introducing a catalyst capable of converting cis-isomers into trans-isomers into said solution, said catalyst being selected from the group consisting of iodine and eosine, and exposing said solution to visible light.

4. A method of producing trans-isomers of a compound selected from the group consisting of vitamin D and esters thereof comprising the steps, forming a neutral to alkaline solution of said compound, introducing a catalyst capable of converting cis-isomers into trans-isomers into said solution, said catalyst being selected from the group consisting of iodine and eosine, introducing into said solution a tertiary amine capable of binding any acid produced but incapable of causing the catalyst to become inoperative, said tertiary amine being selected from the group consisting of pyridine, collidine and quinoline, and exposing said solution to visible light.

5. The method of claim 4 in which the trans-isomer formed is separated from the reaction mixture by treating the reaction mixture with a para-phenylazobenzoyl halide to form thereby the para-phenylbenzoic acid ester of the trans-isomer separating out this ester from the reaction mixture and saponifying this ester to recover the trans-isomer.

6. The method of claim 4 in which the trans-isomer formed is separated from the reaction mixture by treating the reaction mixture with cyanic acid to form thereby the allophane acid ester of the trans-isomer, separating this ester from the reaction mixture and saponifying this ester to recover the trans-isomer.

7. A method of producing trans-isomers of a compound selected from the group consisting of vitamin D and esters thereof comprising the steps, forming a neutral to alkaline solution of said compound, introducing a catalyst capable of converting cis-isomers into trans-isomers into said solution, said catalyst being selected from the group consisting of iodine and eosine, exposing said solution to visible light and reducing the trans-isomer formed to a compound selected from the group consisting of dihydrotachysterol and esters thereof by treating the trans-isomer with a catalyst system capable of hydrogenating part of a plurality of conjugated double bonds, said catalyst system being selected from the group consisting of Raney nickel with hydrogen and an alkali metal with an aliphatic alcohol.

8. The method of claim 7 in which the reduction of the trans-isomer is carried out in the original reaction mixture.

References Cited in the file of this patent

FOREIGN PATENTS 58,764     Netherlands _____ Jan. 15, 1947

OTHER REFERENCES

Gilman: "Organic Chemistry," vol. I, pps. 453 and 454, J. Wiley, 1943. (Copy in Library.)